May 17, 1966 A. W. PUGH 3,251,752

SEA WATER DISTILLATION APPARATUS

Filed April 27, 1962 2 Sheets-Sheet 1

INVENTOR
ALBERT W. PUGH

May 17, 1966    A. W. PUGH    3,251,752
SEA WATER DISTILLATION APPARATUS
Filed April 27, 1962    2 Sheets-Sheet 2

INVENTOR
ALBERT W. PUGH

United States Patent Office 3,251,752
Patented May 17, 1966

---

3,251,752
SEA WATER DISTILLATION APPARATUS
Albert Wilson Pugh, Burlington, Vt., assignor to American Machine & Foundry Company, a corporation of New Jersey
Filed Apr. 27, 1962, Ser. No. 190,715
2 Claims. (Cl. 202—197)

This invention relates in general to distillation apparatus and, more particularly, to improved droplet separation within such apparatus.

In saline water distillation apparatus and the like, commonly known as evaporators, the maximum capacity of a given apparatus or evaporator is determined by several limiting factors, one of which is the allowable or maximum permissible carry-over of impurities in the distillate into the condensate. In sea water evaporators, this carry-over is usually in the form of salts dissolved in minute water particles or droplets that are carried along with the steam or water vapor passing from the evaporating portion of the apparatus into the condenser.

A main object of this invention is to provide a method and an apparatus whereby a saline water evaporator or the like may be operated at a high capacity with little carry-over of impurities into the condensate.

Figure 1:
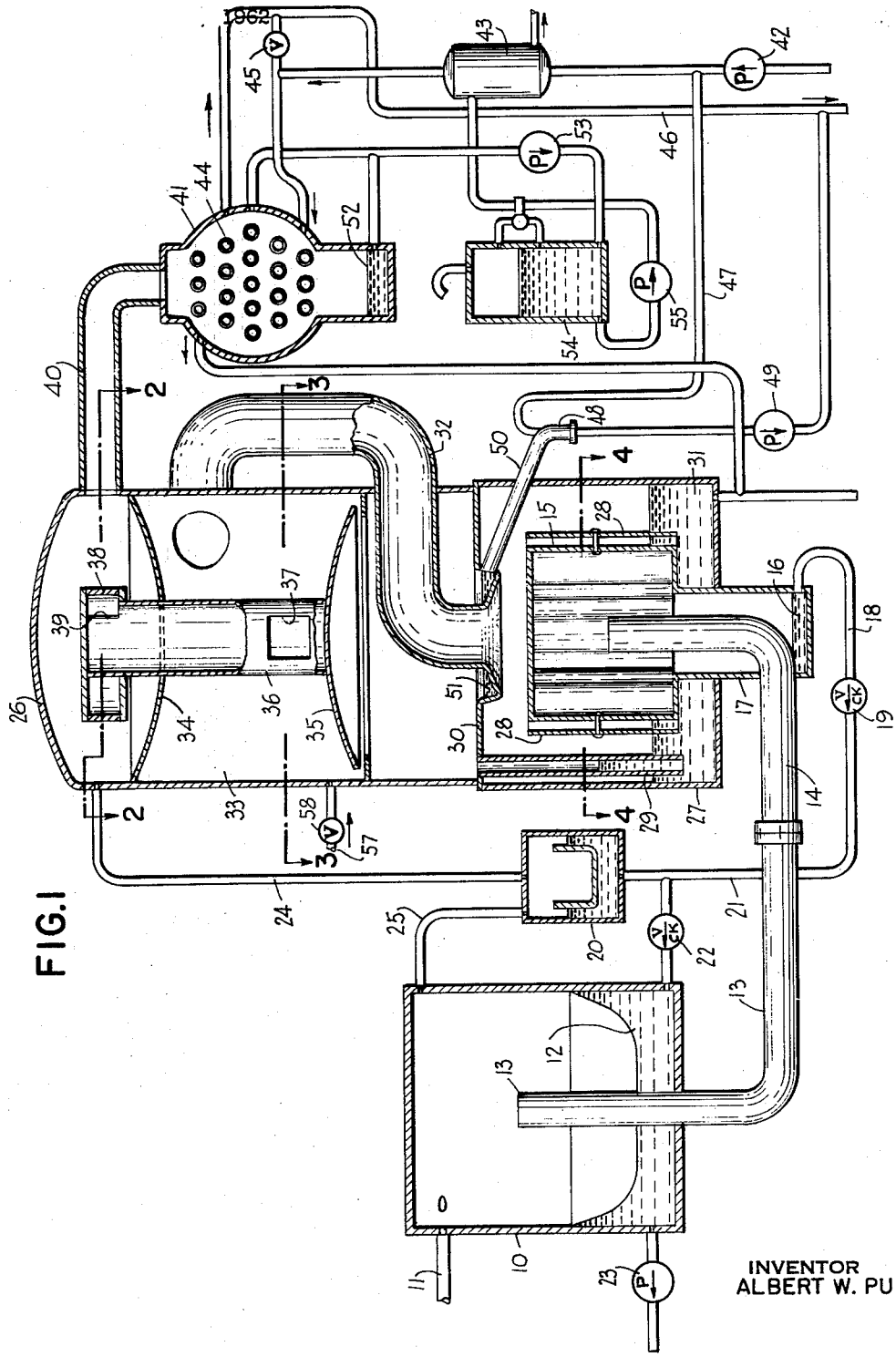
Figure 2:
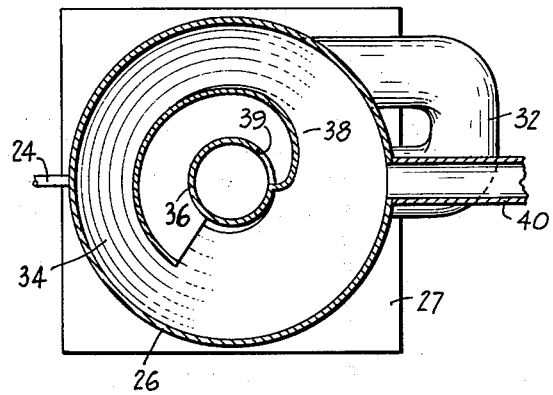
Figure 3:
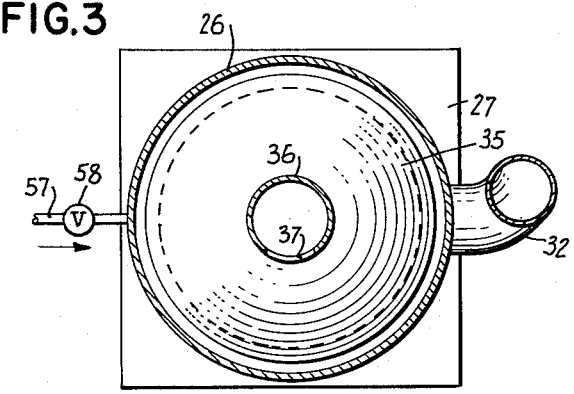
Figure 4:
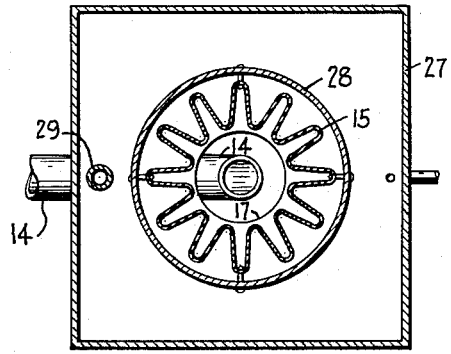

Other objects, advantages and features of invention will become apparent from the following description and accompanying drawing wherein:

FIGURE 1 is a vertical section through elements of a seat water evaporator incorporating the features of this invention; and FIGURES 2, 3 and 4 are sections taken on the lines 2—2, 3—3 and 4—4, respectively.

Referring to the drawing in detail, the particular apparatus shown operates from the waste heat of an internal combustion engine for example. As shown in FIGURE 1, engine cooling water at a temperature from 165° F. to 190° F. enters the cyclonic separator 10 through the pipe 11. The separator 10 is under a partial vacuum so that a portion of the engine cooling water 12 will flash into steam. The swirling action in the separator 10 insures that relatively dry steam enters the centrally located steam pipe 13 which connects with steam pipe 14 which, in turn, leads into the evaporator basket 15. Condensate 16 formed in the evaporator basket 15 drains into the steam chest 17. This condensate 16 passes through the pipe 18 and the check valve 19 to the return trap 20 through the pipe 21. A check valve 22 is connected between pipe 21 and the bottom of separator 10 so that the distillate 16 passes back into the cooling water 12 and is recirculated through the internal combustion engine by a water jacket circulating pump 23. Naturally, other cooling means must be connected to the manifolds of the internal combustion engine to cool it. This apparatus scavenges some of the waste heat from the engine.

The pipes 24 and 25 extend from the return trap 20 to the evaporator shell 26 and from the return trap 20 to the separator 10. Thus the degree of vacuum within the separator 10 is controlled by the vacuum within the evaporator shell 26.

Referring now to FIGURES 1 and 4, the lower portion 27 of the evaporator shell 26 may be rectangular and contain within it the corrugated basket type heating section 15. Disposed about the evaporator basket 15 is a skirt 28 and a pressure equalizing tube 29 which extends upward through the top wall 30 of the lower portion 27. The latent heat of the steam within the evaporator basket 15 is transferred through the basket wall to sea water 31 within the lower portion 27 of the evaporator shell 26. The resulting vapor which is produced about the evaporator basket 15, after primary separation and de- foaming at the top of the skirt 28, enters the vapor duct 32.

As shown in FIGURE 1, vapor duct 32 leads to a cyclonic separator section 33 between the upper plate 34 and the lower plate 35. Steam enters the cyclonic separating section 33 from pipe 32 at an angle so that it swirls about the central duct 36.

As shown in FIGURES 1 and 3, the lower portion of the central duct 36 contains an aperture 37 through which steam enters the central duct 36 to rise above the upper plate 34.

Referring now to FIGURES 1 and 2, a snail 38 leads from an upper opening 39 in the central duct 36 above the plate 34. The snail 38 subjects the steam to abrupt reversal of flow and further centrifugal action. Steam passes from the shell 26 through a pipe 40 to the condenser 41.

Sea water is pumped by the sea water supply pump 42 first through the distillate cooler 43 and then through the condenser tubes 44. Bypass valve 45 leads directly to an overboard drain pipe 46. Some sea water passes through pipe 47 through a suitable eductor 48 which communicates with the brine pump 49 and the overboard drain 46. Thus the brine gutter 50 draws condensate 51 from within shell 26 so that it may be drained as waste.

Condensate 52 is drawn by vacuum pump 53 from the condenser 41 and passed through the air water separator 54. A pump 55 passes distillate through the distillate cooler 43 to fresh water storage tanks or the like (not shown).

It has been found that, in apparatus of the nature of that hereinbefore described, an air bleed located prior to the entry of the vapor into the central duct 36 substantially lowered the chloride content of the distillate. With a given apparatus, distillate may be produced 25 to 50 percent above the normal rated capacity of the given apparatus before unacceptable carry-over of impurities into the condensate occurs. As shown in FIGURE 1, an air bleed pipe 57 leads through a suitable metering valve or orifice 58. The point of entry of pipe 57 into the cyclonic separator section 33 is not critical.

*Example*

In a particular sea water evaporator of the type described which operates at a capacity of from 6,600 to 7,000 gallons of fresh water per day without exceeding a given chloride content, 20 pounds per hour of air was bled into the evaporator through the pipe 57 and the valve 58. The capacity of the apparatus was then increased to over 8,500 gallons per day without excessive carry over of chlorides into the product water. In one sea test made with a unit installed on board a ship, the unit was raised from a maximum capacity of 6,600 to 7,000 gallons per day to a maximum capacity of 9,300 gallons per day before excessive carry over occurred.

The practical upper limits at which air bleeding into a given unit may be made are determined by the capacities of the condenser, the air separator, the vacuum pumps, and/or other elements of the apparatus. In the unit tested, the air bleed could be reduced to 6 pounds per hour into the evaporator with effective results.

*Theory.*—As the steam or water vapor passes through the cyclonic separator 33 and the snail 38, a sufficient pressure drop occurs to cause enough flashing into vapor of brine droplets to take place. The addition of air prevents the brine droplets from flashing to allow an increase of the output before the distillate is contaminated.

Initially, it was believed that the heating of air being bled into the cyclonic separator of the evaporator from its ambient temperature to the temperature of the water vapor was critical. In order to heat this air, a small amount of vapor would have to condense forming a mist. This mist would tend to agglomerate with the brine particles thereby increasing the mass of the brine particles slightly. Thus the centrifugal effect produced by the centrifugal separator and the snail would increase the kinetic energy of the brine particles sufficiently to cause these particles to be thrown to the periphery of the shell which is away from the main vapor path to the vapor off take leading to the condenser.

To test this theory, the air bled into the evaporator through the pipe 57 was preheated to 170° F. which was approximately the temperature of the evaporator outside the snail 38. It was then found that the heating of the air within the evaporator plays a minor role as the air bleed of heated air into the evaporator still considerably increased its capacity to produce uncontaminated distillate.

It is now conjectured that the particles of brine flash within the evaporator operating without air bleed because there is a pressure drop through the centrifugal separator and the snail. When air is bled into the evaporator, the water vapor occupies the evaporator and behaves thermodynamically as though it were the only gas in the evaporator. At the same time, the air likewise occupies the evaporator shell and behaves thermodynamically as though it were the only gas occupying the evaporator. This is not so with the droplets of brine which react to the total pressure of the mixture of air and water vapor. This phenomenon is evident in the same way that the surface of a rain drop falling through the air reacts to atmospheric pressure which is the sum of the partial pressures of oxygen, nitrogen and water vapor surrounding the rain drop. Therefore, before any particle of brine can flash as it travels through the separator, the pressure drop of the mixture through the separator has to be greater than the partial pressure of the air bled into evaporator. Thus, even with air bleed, when the pressure drop of the mixture through the separator is greater than the partial pressure of air bled into the evaporator, the brine droplets will tend to flash which lowers their mass and consequently their kinetic energy. When the brine droplets lose sufficient mass, they will not separate from the main vapor path upon emergence from the snail and carry over of brine into the condensate will occur.

If the air bleed is decreased until carry over of contaminants occurs, the air bleed rate has to be increased appreciably before carry over is reduced again to acceptable limits. One explanation of this phenomenon is that a finite pressure drop is required to initiate the flashing of the brine droplets. Once this flashing is initiated, thermal equilibrium will be maintained and gradual flashing will occur. Therefore, it may be presumed that the brine droplets may be able to exist in a state of superheat until the air bleed is reduced to start their flashing, whereon a moisture condensation shock is formed and the vapor is quickly returned to a state of thermal equilibrium.

While this invention has been described in connection with a cyclonic separator, it is believed that the same effect on distillate purity can be obtained by bleeding air into an evaporator prior to any physical droplet separating means. Thus the effect of the air bleed should be desirable and take place in evaporators using mesh separators. In addition, the distillate purity of evaporators operating at their designed capacities in contaminated port waters can be increased by the bleeding of air into the evaporator prior to a droplet separating section.

What is claimed is:

1. In a sea water distillation apparatus, an evaporating section for converting sea water to a vapor distillate, a cylindrical cyclonic separator for separating said vapor into droplets of water and droplets of brine, a condenser, a vapor duct for conducting said vapor from the evaporating section to a discharge opening in the upper part of said cylindrical cyclonic separator for the passage of vapor thereto, means introducing air at a controlled rate into the lower part of said separator and remote from said discharge opening to thereby improve the purity of the distillate, a central duct leading upward from said cylindrical cyclonic separator, means comprising a snail and enclosing shell portion disposed about the upper end of said central duct, and a conduit leading from said last named means to said condenser.

2. The apparatus according to claim 1 in which the discharge opening of the vapor duct leads tangentially into the cylindrical cyclonic separator.

References Cited by the Examiner

UNITED STATES PATENTS

| | | | |
|---|---|---|---|
| 389,160 | 8/1888 | Marr | 202—201 X |
| 623,880 | 4/1899 | Brown | 202—201 |
| 768,795 | 8/1904 | Gathmann | 202—163 |
| 1,252,154 | 1/1918 | Nenninger | 202—201 X |
| 2,398,580 | 4/1946 | Crawford | 202—185 |
| 2,803,591 | 8/1957 | Coanda et al. | |
| 2,960,449 | 11/1960 | Williamson | 202—197 X |

FOREIGN PATENTS 3,377  1873  Great Britain.

OTHER REFERENCES

German application K 24,930, Dec. 13, 1956 (5 pp. spec., 2 pp. dwg.).

NORMAN YUDKOFF, *Primary Examiner.*

F. E. DRUMMOND, M. H. SILVERSTEIN,
*Assistant Examiners.*